United States Patent
Ion

(10) Patent No.: US 8,681,824 B2
(45) Date of Patent: Mar. 25, 2014

(54) DTMF TONE MONITORING APPARATUS AND METHOD OF IDENTIFYING A DTMF TONE

(75) Inventor: Dragos Ion, Bucharest (RO)

(73) Assignee: Freeascale Semiconductor, Inc., Austin, TX (US)

( * ) Notice: Subject to any disclaimer, the term of this patent is extended or adjusted under 35 U.S.C. 154(b) by 148 days.

(21) Appl. No.: 12/918,185

(22) PCT Filed: Mar. 14, 2008

(86) PCT No.: PCT/IB2008/050965
§ 371 (c)(1), (2), (4) Date: Aug. 18, 2010

(87) PCT Pub. No.: WO2009/112891
PCT Pub. Date: Sep. 17, 2009

(65) Prior Publication Data
US 2010/0329367 A1    Dec. 30, 2010

(51) Int. Cl.
*H04J 3/12* (2006.01)
*H04B 7/216* (2006.01)

(52) U.S. Cl.
USPC ............................... 370/526; 370/342

(58) Field of Classification Search
USPC .................................. 370/526, 342
See application file for complete search history.

(56) References Cited

U.S. PATENT DOCUMENTS

| | | | |
|---|---|---|---|
| 6,049,537 A * | 4/2000 | Proctor et al. | 370/342 |
| 6,259,691 B1 | 7/2001 | Naudus | |
| 6,370,244 B1 | 4/2002 | Felder et al. | |
| 6,961,424 B1 | 11/2005 | Vialle et al. | |
| 7,035,293 B2 | 4/2006 | Branden | |
| 7,039,044 B1 | 5/2006 | Whitfield et al. | |
| 2002/0141552 A1 * | 10/2002 | Fushimi | 379/93.28 |
| 2006/0083220 A1 | 4/2006 | Mekala et al. | |

OTHER PUBLICATIONS

International Search Report and Written Opinion correlated to PCT/IB2008/050965 dated Dec. 4, 2008.

* cited by examiner

*Primary Examiner* — Mark Rinehart
*Assistant Examiner* — Angel Brockman

(57) ABSTRACT

A tone monitoring apparatus comprises a tone detector arranged to detect, when in use, a tone having a first duration equal to or greater than a predetermined duration. The tone detector is further arranged to select, when in use, a first signal path between a channel input and a channel output, the selection being in response to the first duration of the tone being equal to or greater than the predetermined duration.

19 Claims, 3 Drawing Sheets

DTMF TONE MONITORING APPARATUS AND METHOD OF IDENTIFYING A DTMF TONE

FIELD OF THE INVENTION

This invention relates to a tone monitoring apparatus of the type that, for example, may be used to identify a tone to be transmitted over a communications network, for example a packet-switched network. This invention also relates to a method of identifying a tone of the type that, for example, may have been generated for communication over a communications network, for example a packet-switched network.

BACKGROUND OF THE INVENTION

In the field of packet communications, for example Internet Protocol (IP) telephony, it is known to communicate voice data over a communications network, for example a packet switched network, employing a suitable transport protocol. One known type of transport protocol is the Real-time Transport Protocol (RTP). Typically, voice data is arranged in frames and received by a so-called Vocoder (Voice Encoder). The vocoder employs a compression algorithm in order to reduce bandwidth of voice data transmitted over the network, the compressed voice data being provided to an RTP encoder for generating RTP-compliant packets containing the voice data as payload. When communicating over the network, it is sometimes desirable to communicate Dual Tone Multi-Frequency (DTMF) signals, particularly when a user needs to interact with an automated system, for example an automated call direction system. However, communication of a DTMF signal "in-band" via the vocoder results in degradation of the DTMF signal due to the use of the compression algorithm, the compression algorithm having been designed for compressing voice signals and not DTMF tones. In order to avoid the degradation of the DTMF signal resulting from in-band communication of the DTMF signal, the Internet Engineering Task Force (IETF) Request For Comments (RFC) 2833 provides a framework for communicating the DTMF signal "out-of-band".

A DTMF detector is therefore employed in order to detect the DTMF signal and communicate data identifying the nature of the DTMF signal to an RFC 2833 encoder, the RFC 2833 encoder being coupled to the RTP encoder for communication of the data identifying the DTMF signal to a receiver where the DTMF signal is regenerated based upon the data identifying the DTMF signal. In order to provide uniformity in relation to DTMF signals, the Telecommunication Standardization Sector of the International Telecommunications Union (ITU-T) Recommendation Q.24 specifies certain conditions for a DTMF signal to observe in order to qualify as a bona-fide DTMF signal. However, known DTMF detectors are prone to mis-detecting certain signals having durations less than those specified by the Q. 24 Recommendation, for example facsimile transmission tones, as bona-fide DTMF signals, resulting in DTMF tones being regenerated at the receiver in error.

Furthermore, DTMF detectors are known to suffer from so-called DTMF leakage that can effectively became appended to a given DTMF signal, thereby extending the duration of the given DTMF signal and hence reduce a so-called "pause duration" between DTMF signals. Consequently, the pause duration can reduce below a pause duration specified in the Q. 24 Recommendation and hence no longer be compliant with the Q. 24 Recommendation. The receiver, operating in accordance with the Q. 24 Recommendation and receiving consecutive DTMF signals will reject one or more received DTMF signals as non-compliant with the Q. 24 Recommendation and hence not recognised.

SUMMARY OF THE INVENTION

The present invention provides a tone monitoring apparatus as set forth in the accompanying claims. The present invention also provides a method of identifying a tone as set forth in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
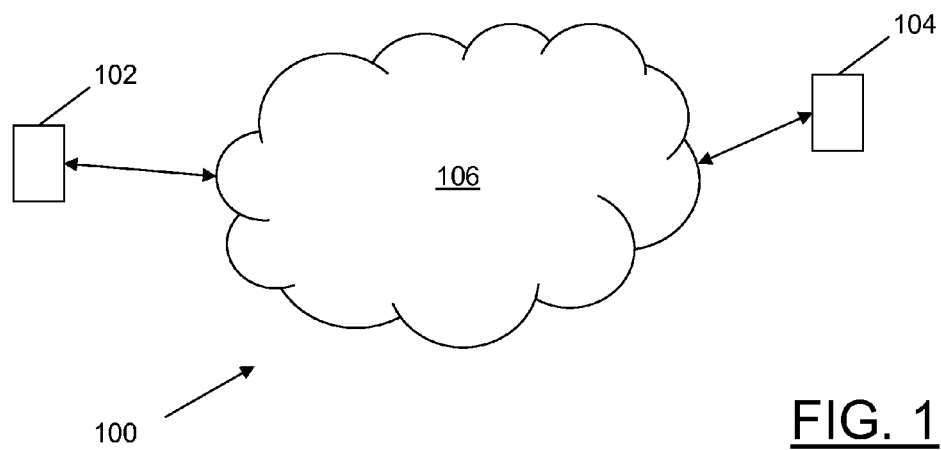
FIG. 1 is a schematic diagram of an example of communications connectivity between media gateway devices via a communications network.

Referring to FIG. 1, a communications system 100 may comprise a first media gateway apparatus 102 capable of communicating with a second media gateway apparatus 104 via a communications network 106. In this example, the communications network 106 is the Internet, though the skilled person should appreciate that other packet-switched communications networks can be employed. In this respect, the first and second media gateways 102, 104 support Voice over IP (VoIP) communications therebetween using a Real-time Transport Protocol (RTP).

The first media gateway apparatus 102 comprises a communications card, for example a PICMG AMC.0 R2.0 AdvancedTCA Mezzanine Card (not shown) available from Freescale® Semiconductor, Inc. The precise architecture of the Mezzanine Card is not relevant for the purposes of describing the embodiments herein and so, for the sake of simplicity and conciseness of description, the architecture of the Mezzanine Card will not be described further herein. However, it is sufficient to know that the Mezzanine card may comprise a number of Digital Signal Processors (DSPs), at least one of which constitutes a processing resource capable of supporting the following functional structure.

Figure 2:
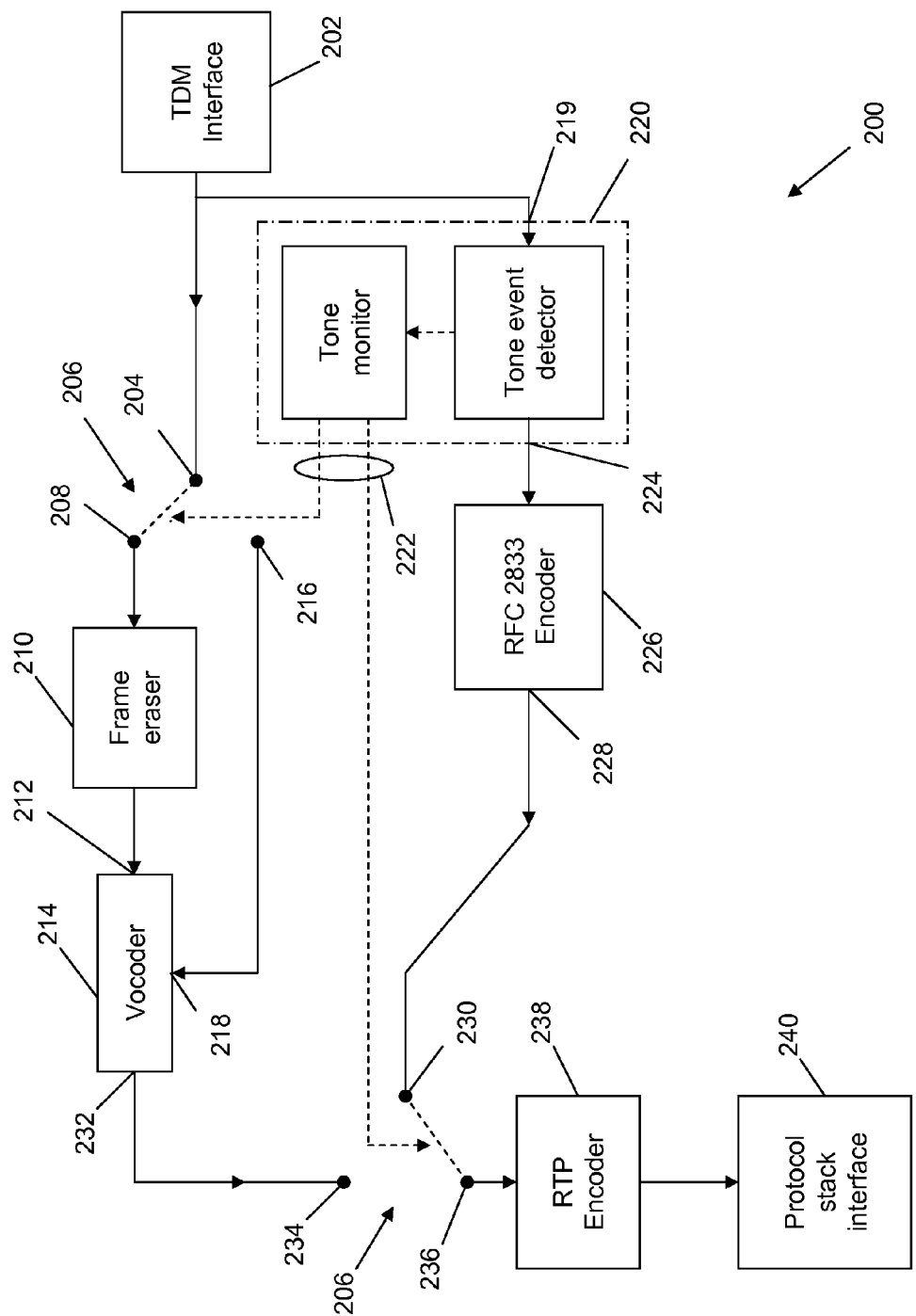
FIG. 2 is a schematic diagram of an example of an apparatus in an embodiment of the invention.

Referring to FIG. 2, a DSP may implement a signal pathway control apparatus 200, the signal pathway control apparatus 200 may comprise a Time Division Multiplexed (TDM) interface 202 constituting a channel input. The TDM interface 202 is coupled to a first input node 204 of a switching fabric 206. A first output node 208 of the switching fabric 206 is coupled to a frame eraser module 210 for erasing signals input thereto. In this example, the frame eraser module 210 is programmable so as to be able to erase a whole frame or a portion of a frame. The frame eraser module 210 is coupled to a first input of a first encoder. In this example, the first encoder is a vocoder 214. However, the skilled person should appreciate that any suitable encoder module can be employed depending upon the application for which the signal pathway control apparatus 100 is required. A second output node 216 of the switching fabric 206 is coupled to a second input 218 of the vocoder 214.

The TDM interface 202 is also coupled to an input 219 of a tone monitoring apparatus 220, a control output 222 of the tone monitoring apparatus 220 being coupled to the switching fabric 206. A signal output 224 of the tone monitoring apparatus 220 is coupled to a second encoder. In this example, the second encoder is an RFC 2833-compliant encoder 226. An output 228 of the RFC 2833-compliant encoder 226 is coupled to a second input node 230 of the switching fabric 206.

An output 232 of the vocoder 214 is coupled to a third input node 234 of the switching fabric 206, a third output node 236 of the switching fabric 206 being coupled to a third encoder. In this example, the third encoder is a Real-time Transport Protocol (RTP) encoder 238. The RTP encoder 238 is coupled to a protocol stack interface 240 constituting a channel output.

In the above example, a first signal path extends from the channel input to the channel output via the tone monitoring apparatus 220, the RFC 2833-compliant encoder 226, the switching fabric 206, and the RTP encoder 238. A second signal path extends from the channel input to the channel output via the switching fabric 206, the frame eraser module 210, the vocoder 214, the switching fabric 206 again and the RTP encoder 238. A third signal path extends from the channel input to the channel output via the switching fabric 206, the vocoder 214, the switching fabric 206 again, and the RTP encoder 238.

Figure 3:
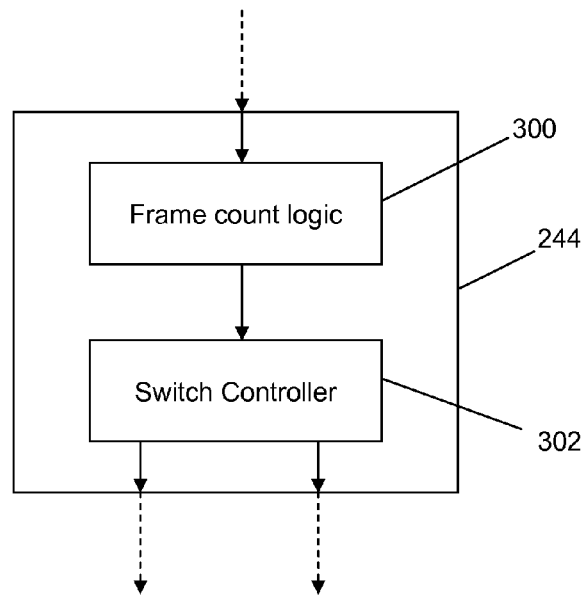
FIG. 3 is a schematic diagram of an example of a tone monitor apparatus of FIG. 2.

In this example, the tone monitoring apparatus 220 comprises a tone event detector 242 coupled to a tone monitor 244. The tone event detector 242 is implemented in the DSP in any suitable known manner employing, for example, a Fast Fourier Transform (FFT) or a Goertzel algorithm in order to detect a frame believed to correspond to a DTMF tone and is coupled between the input of the tone monitoring apparatus 220 and the signal output 224 of the tone monitoring apparatus 220. The tone monitor 244 is coupled to the control output 222 of the tone monitoring apparatus 220. Turning to FIG. 3, the tone monitor 244 may comprise a frame count logic 300, an input thereof being coupled to the tone event detector 242. The frame count logic 300 is also coupled to a switch controller 302, the switch controller 302 being coupled to the control output 222 of the tone monitoring apparatus 220. In this example, the frame count logic 300 is also capable of communicating an instruction to the frame eraser module 210 with regard to whether a whole frame or part of the frame has to be erased.

In operation, the signal pathway control apparatus 200 is capable of communicating a DTMF signal or tone in an out-of-band manner, i.e. without using the vocoder 214. To communicate the DTMF tone out-of-band, the tone monitoring apparatus 220 is capable of identifying bona fide tones and directing the DTMF tone to be communicated to the RFC 2833-compliant encoder 226 for communication. An example of a bona fide or valid DTMF tone is a tone that complies with ITU-T Q.24 Recommendation. In the present example, compliance with the criterion of tone duration is required. To demonstrate this functionality, the signal pathway control apparatus 200 will now be described in the context of two input signals: a first input signal may comprise a first voice signal followed by a 45 ms DTMF tone, which is then followed by a second voice signal, and a second input signal may comprise the first voice signal followed by a 30 ms tone, for example a facsimile tone that is confusable with a DTMF tone, followed by the second voice signal.

Figure 4:
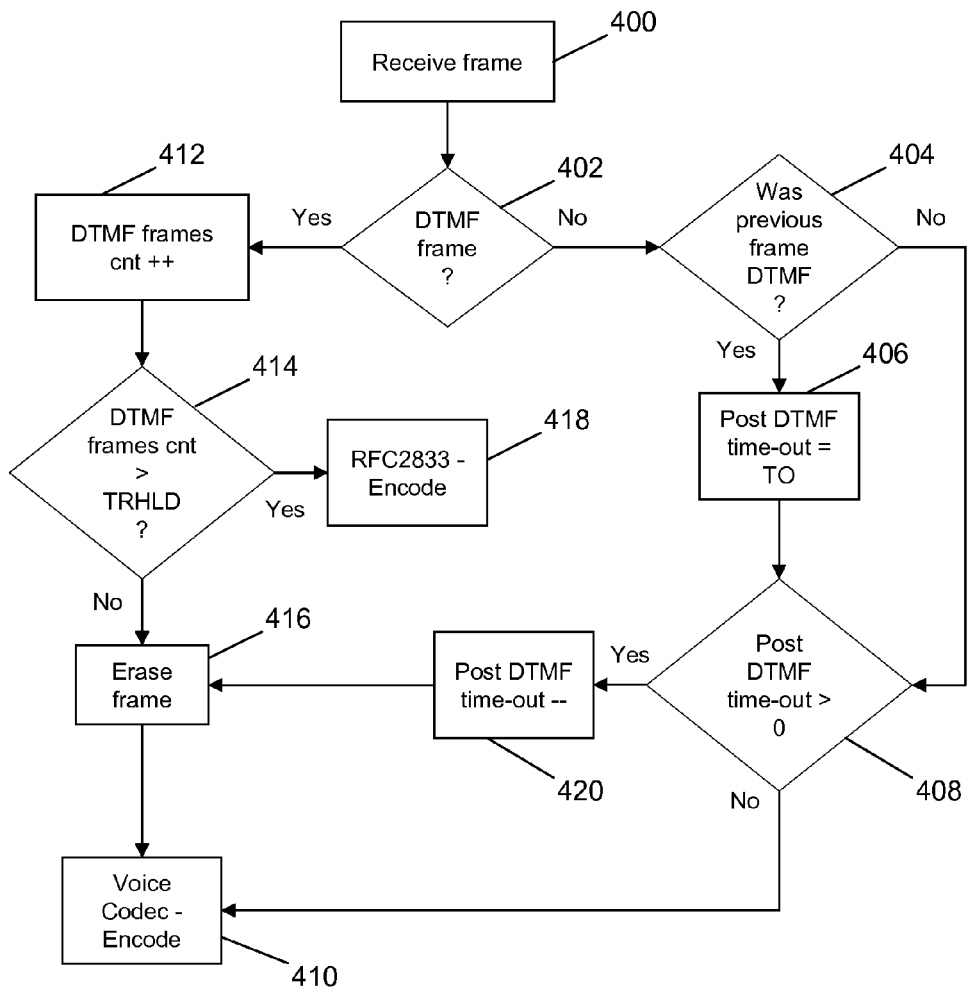
FIG. 4 is a flow diagram of an example of a method of operation of the apparatus of FIG. 1.

Referring to FIG. 4, a frames_cnt variable and a post_DTMF_time-out variable are each initialised to zero. In this example, the first input signal is provided via the TDM interface 202 organised as frames, for example, 10 ms in duration. Each frame of a first series of frames comprising the first voice signal is received (Step 400) by the tone monitoring apparatus 220, the tone event detector 242 analysing each frame and determining (Step 402) whether each frame corresponds to a DTMF tone (hereinafter referred to as a DTMF tone event). In the case of the first input signal, a first frame of the first series of frames does not correspond to a DTMF tone event and so the frame count logic 300 proceeds to determine (Step 404) whether the first frame of the first series of frames was preceded by a frame corresponding to a DTMF tone event. As this is the first frame of the first series of frames and, in any event, each frame of the first series of frames relates to the first voice signal, the frame count logic 300 then determines (Step 408) whether the post_DTMF_time-out variable is greater than zero. As the post_DTMF_time-out variable is unchanged since initialisation, the post_DTMF_time-out variable is 0 and so the frame count logic 300 instructs the switch controller 302 to issue one or more control signals to cause the switching fabric 206 to divert the first frame of the first series of frames via the third signal path and so the first frame is processed (Step 410) by the vocoder 214 and then the RTP encoder 238 before being transmitted to the second media gateway 104 via the protocol stack interface 240. The above steps are repeated in relation to the remaining frames of the first series of frames relating to the first voice signal. The skilled person will appreciate that, at the second media gateway 104, the first voice signal is reproduced in accordance with any suitable signal reproduction technique.

After the first series of frames, each frame of a second series of frames comprising the 45 ms DTMF signal is received (Step 400) in turn by the tone monitoring apparatus 220, the tone event detector 242 analysing each frame and determining (Step 402) whether each frame constitutes a DTMF tone event. In the case of the second series of frames, each frame is a DTMF frame and so the frame count logic 300 increments (Step 412) the frames_cnt variable by one in response to an indication from the tone event detector 242 detecting a DTMF tone event. The frame count logic 300 then determines (Step 414) whether the value of the frames_cnt variable is greater than a threshold value, for example 4, corresponding to a predetermined duration threshold, for example 40 ms (when using 10 ms frames). As only a first frame of the second series of frames has been processed by the tone monitoring apparatus 220, the frame count logic 300 instructs the frame eraser module 210 to erase complete frames as a default setting and instructs the switch controller 302 to manipulate the switching fabric 206 so that the first frame of the second series of frames is directed via the second signal path and the first frame of the second series of frames is therefore erased (Step 416) by the frame eraser module 210. The absence of signal received by the vocoder 214 (Step 410) is then substantially translated into a silence and passed to the RTP encoder 238 before being transmitted to the second media gateway 104 via the protocol stack interface 240. The above process (Steps 402, 412, 414, 416, 410) is repeated until the frame count logic 300 augments the frames_cnt variable to 5, signifying that the tone event detector 242 has detected the 45 ms DTMF tone for more than 40 ms. As the threshold value is 4, the frame count logic 300 instructs the switch controller 302 to issue at least one control signal to cause the switching fabric 206 to couple the RFC 2833-compliant encoder 226 to the RTP encoder 238, i.e. implement the first signal path. As the vocoder 214 is no longer operably coupled to the RTP encoder 238, the fifth frame is effectively discarded.

In response to detection of the DTMF tone event, the tone event detector 242 generates DTMF tone data indicative of the nature of the DTMF tone detected in accordance with a normal operating mode of the tone event detector 242. The RFC 2833-compliant encoder 226 receives the DTMF tone data generated by the tone event detector 242 and the DTMF tone data is encoded (Step 418) by the RFC 2833-compliant encoder 226 as a payload and passed to the RTP encoder 238 for encapsulation in an RTP packet. The RTP packet is then communicated to the second media gateway 104 via the protocol stack interface 240. At the second media gateway 104, the RTP packet is decoded and the RFC 2833-compliant payload used to regenerate the DTMF tone at the second media gateway 104.

After the 45 ms DTMF signal has finished, each frame of a third series of frames comprising the second voice signal follows the second series of frames. Each frame of the third series of frames comprising the second voice signal is received (Step 400) by the tone monitoring apparatus 220, the tone event detector 242 analysing each frame and determining (Step 402) whether each frame corresponds to a DTMF tone event. In the case of the third input signal, a first frame does not correspond to a DTMF tone event and so the frame count logic 300 determines (Step 404) whether the frame preceding the first frame of the third series of frames corresponded to a DTMF tone event. In the present instance, the first frame of the third series of frames follows a DTMF tone event and so the post_DTMF_time-out variable is set to a time out value, TO, in this example 15 ms. The frame count logic 300 then determines (Step 408) whether the post_DTMF_time-out variable is greater than zero. As the post_DTMF_time-out variable was set to 15 ms in the previous step, the post_DTMF_time-out variable is decremented by a duration of the frame length employed (Step 420), for example 10 ms, and the frame count logic 300 then analyses the post_DTMF_time-out variable to determine if the post_DTMF_time-out variable is negative in value. As the post_DTMF_time-out variable is not currently negative in value, the frame count logic 300 instructs the frame eraser module 210 to erase complete frames and instructs the switch controller 302 to issue one or more control signals to cause the switching fabric 206 to direct the first frame of the third series of frames via the second signal path and so the first frame is erased (Step 416) by the frame eraser module 210. The absence of signal received by the vocoder 214 (Step 410) is then translated into a silence and passed to the RTP encoder 238 before being transmitted to the second media gateway 104 via the protocol stack interface 240. The tone event detector 242 then determine (Step 402) that a second frame of the third series of frames does not correspond to a valid DTMF tone and so the frame count logic 300 proceeds to determine (Step 404) whether the second frame of the third series of frames was preceded by a frame corresponding to a DTMF tone event. The second frame of the third series of frames is not, of course, preceded by a frame corresponding to a DTMF tone event, and so, the frame count logic 300 then proceeds to determine (Step 408) whether the post_DTMF_time-out variable is greater than zero. As the post_DTMF_time-out variable is decremented further (Step 420) by the duration of the frame length employed to yield a value of −5 ms. The frame count logic 300 then determines that the post_DTMF_time-out variable is negative in value and so concludes that a portion of the second frame of the third series of frames has to be erased. Consequently, the frame count logic 300 calculates a delete portion value by adding the frame length being employed to the current value of the post_DTMF_time-out variable and communicates the delete portion value to the frame eraser module 210 as an instruction to only erase the portion of a given frame calculated and not a whole frame. The frame count logic 300 then instructs the switch controller 302 to issue one or more control signals to cause the switching fabric 206 to direct the second frame of the third series of frames via the second signal path. In this example, the delete portion value is calculated to be 5 ms. The frame eraser module 210 therefore erases (Step 416) an initial 5 ms portion of the second frame of the third series of frames. The 5 ms absence of signal received by the vocoder 214 (Step 410) is then translated into a silence and passed to the RTP encoder 238 before being transmitted to the second media gateway 104 via the protocol stack interface 240. Likewise, the remainder of the second frame is simply permitted to pass through to the vocoder 214 for processing by the RTP encoder 238 before being transmitted to the second media gateway 104 via the protocol stack interface 240.

Subsequent frames of the third series of frames are not preceded by frames corresponding to DTMF tone events and so are directed, via the third signal path directly to the vocoder 214 (Step 410) and then the RTP encoder 238 before being transmitted to the second media gateway 104 via the protocol stack interface 240.

In a second example, the frames_cnt and the post_DTMF_time-out variables are initialised to zero and the second input signal is processed by the signal pathway control apparatus 200. In this example, the second input signal comprises the first voice signal and so the first series of frames corresponding to the voice signal is directed, via the third signal path directly to the vocoder 214 (Step 410) and then the RTP encoder 238 before being transmitted to the second media gateway 104 via the protocol stack interface 240 in the manner already described above. However, upon receipt of a first frame of a fourth series of frames comprising the tone confusable with a DTMF tone, the tone event detector 242 detects a tone event that is interpreted as a DTMF tone event (Step 402) resulting in the frame_cnt variable being incremented (Step 412).

The frame count logic 300 then determines (Step 414) whether the value of the frames_cnt variable is greater than a threshold value, for example 4, corresponding to the predetermined duration threshold, for example 40 ms (when using 10 ms frames). As only a first frame of the fourth series of frames has been processed by the tone monitoring apparatus 220, the frame count logic 300 instructs the frame eraser module 210 to erase complete frames as a default setting and also instructs the switch controller 302 to manipulate the switching fabric 206 so that the first frame of the fourth series of frames is directed via the second signal path and the first frame of the fourth series of frames is therefore erased (Step 416) by the frame eraser module 210. The absence of signal received by the vocoder 214 (Step 410) is then substantially translated into a silence and passed to the RTP encoder 238 before being transmitted to the second media gateway 104 via the protocol stack interface 240. The above process (Steps 402, 412, 414, 416, 410) is repeated in respect of second and third 10 ms frames of the fourth series of frames.

As the tone confusable with the DTMF tone is less than 40 ms in duration, and so not a bona-fide DTMF signal, a first frame of the third series of frames follows the fourth series of frames and so the first frame of the third series of frames is not detected (Step 402) by the tone event detector 242 as relating to a DTMF tone event. Consequently, the first frame of the third series of frames follows a frame that does not correspond to a valid DTMF tone and so the frame count logic 300 then determines (Step 408) whether the post_DTMF_time-out variable is greater than zero. As the post_DTMF_time-out variable is still set to the initialised value of zero, the post_DTMF_time-out variable is not greater than zero and the frame count logic 300 then instructs the switch controller 302 to issue one or more control signals to cause the switching fabric 206 to direct the first frame of the third series of frames via the third signal path and so the first frame of the third series of frames is processed (Step 410) by the vocoder 214 and then the RTP encoder 238 before being transmitted to the second media gateway 104 via the protocol stack interface 240. Subsequent frames of the third series of frames are also not preceded by frames corresponding to a valid DTMF tone and so are directed, via the third signal path directly to the vocoder 214 (Step 410) and then the RTP encoder 238 before being transmitted to the second media gateway 104 via the protocol stack interface 240.

Although the above examples have been described in the context of frames of 10 ms length, the skilled person should appreciate that other lengths of frame can be employed, the threshold value used being set to a value corresponding to the number of frames that need to be detected as corresponding to the DTMF tone. For example, where a frame length of 30 ms is employed, it is necessary to set the threshold value to 2, because the predetermined duration threshold of 40 ms used in the above examples falls within the second frame (31 ms to 60 ms). It should also be appreciated that although the predetermined duration threshold of 40 ms has been employed in the above example, any suitable duration threshold can be employed, for example as set by a standardisation body, such as is set out in the ITU-T Q.25 Recommendation.

It is thus possible to provide a tone monitoring apparatus and a method of identifying a tone having an ability to correctly identify DTMF tones in a reliable and processing overhead-efficient manner. Additionally, improved estimation of a duration of a valid DTMF tone by a recipient thereof is provided. Isolation of DTMF leakage and non-DTMF tones from valid DTMF tones is also achieved as well as maintenance of pause durations between DTMF tones. It is also possible to provide isolation of DTMF tones from other signals to be communicated. Furthermore, as a result of simultaneous production of in-band and out-of-band streams, no delay is introduced into the in-band stream. Additionally, impairments, for example jitter or bursts, are not introduced into an IP and/or RTP data stream.

Of course, the above advantages are exemplary, and these or other advantages may be achieved by the invention. Further, the skilled person will appreciate that not all advantages stated above are necessarily achieved by embodiments described herein Some of the above embodiments, as applicable, may be implemented using a variety of different information processing systems. For example, although FIGS. 1, 2 and 3 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of apparatus 200 are circuitry located on a single integrated circuit or within a same device. Alternatively, apparatus 200 may include any number of separate integrated circuits or separate devices interconnected with each other. For example, the switching fabric 206 may be located on a same integrated circuit as the tone monitoring apparatus 220 or on a separate integrated circuit or located within another peripheral or slave discretely separate from other elements of the apparatus 200. The vocoder 214 may also be located on separate integrated circuits or devices. Also for example, the apparatus 200 or portions thereof may be soft or code representations of physical circuitry or of logical representations convertible into physical circuitry. As such, the apparatus 200 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

All or some of the software described herein may be received elements of the apparatus 200, for example, from computer readable media or other media on other computer systems. Such computer readable media may be permanently, removably or remotely coupled to an information processing system such as the apparatus 200. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, the apparatus 200 is part of a computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

In the foregoing description, the invention has been described with reference to specific examples of embodiments of the invention. It will, however, be evident that various modifications and changes may be made therein without departing from the broader spirit and scope of the invention as set forth in the appended claims. For example, connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A tone monitoring apparatus comprising:
   a tone detector arranged to detect, when in use, a tone having a first duration equal to or greater than a predetermined duration;
   wherein the tone detector is further arranged to select, when in use, a first signal path between a channel input and a channel output, the first signal path being via a first encoder and the selection being in response to the first duration of the tone being equal to or greater than the predetermined duration; and
   wherein the tone detector is arranged to select, when in use, a second signal path, as an alternative to the first signal path, the second signal path comprising a signal eraser module and a second encoder, wherein the signal eraser module is arranged to prevent, when in use, the second encoder from receiving the tone, at least during at least a portion of time the second signal path is selected.

2. An apparatus as claimed in claim 1, further comprising a third signal path coupled to the second encoder so as to avoid the signal eraser module, the third signal path being selectable in response to the tone not being detected.

3. An apparatus as claimed in claim 1, wherein the tone detector comprises:
   a tone event detector arranged to detect, when in use, a tone event of a second duration; and
   a duration monitor operably coupled to the tone event detector in order to determine the first duration, consecutive instances of the tone event having the first duration.

4. An apparatus as claimed in claim 3,
   wherein the duration monitor is arranged to select, when in use, the first signal path in response to the first duration being equal or greater than the predetermined duration.

5. An apparatus as claimed in claim 3, wherein the tone comprises the tone event.

6. An apparatus as claimed in claim 1, further comprising:
a second signal path, the second signal path being via a second encoder preceded by a signal eraser module; wherein
the signal eraser module is arranged to prevent, when in use, the second encoder from receiving the tone event.

7. An apparatus as claimed in claim 6, further comprising:
a switching module operably coupled between the channel input and the second encoder.

8. An apparatus as claimed in claim 7, wherein the switching module is operably coupled between the channel input and the signal eraser module.

9. An apparatus as claimed in claim 7, wherein the tone detector is operably coupled between the channel input and the first encoder.

10. An apparatus as claimed in claim 9, wherein the switching module is operably coupled between the first and second encoders and a third encoder.

11. An apparatus as claimed in claim 10, wherein the third encoder is coupled to the channel output.

12. An apparatus as claimed in claim 10, wherein the third encoder is a Real-time Transport Protocol encoder.

13. An apparatus as claimed in claim 6, wherein the tone detector comprises:
a tone event detector arranged to detect, when in use, a tone event of a second duration; and
a duration monitor operably coupled to the tone event detector in order to determine the first duration, consecutive instances of the tone event having the first duration.

14. An apparatus as claimed in claim 1, wherein the predetermined duration is 40 ms.

15. An apparatus as claimed in claim 1, wherein the second encoder is a vocoder.

16. An apparatus as claimed in claim 1, wherein the first encoder is an RFC2833-compliant encoder.

17. An apparatus as claimed in claim 1, wherein the tone detector comprises:
a tone event detector arranged to detect, when in use, a tone event of a second duration; and
a duration monitor operably coupled to the tone event detector in order to determine the first duration, consecutive instances of the tone event having the first duration.

18. A signal processing integrated circuit for implementing a tone monitoring apparatus, the circuit comprising:
a tone detector arranged to detect, when in use, a tone having a first duration equal to or greater than a predetermined duration;
wherein the tone detector is further arranged to select, when in use, a first signal path between a channel input and a channel output, the first signal path being via a first encoder and the selection being in response to the first duration of the tone being equal to or greater than the predetermined duration; and
wherein the tone detector is arranged to select, when in use, a second signal path, as an alternative to the first signal path, the second signal path comprising a signal eraser module and a second encoder, wherein the signal eraser module is arranged to prevent, when in use, the second encoder from receiving the tone, at least during at least a portion of time the second signal path is selected.

19. A method of identifying a tone, the method comprising:
detecting a tone having a first duration equal to or greater than a predetermined duration; and
selecting a first signal path between a channel input and a channel output, the first signal path being via a first encoder and the selection being in response to the first duration of the tone being equal to or greater than the predetermined duration;
selecting a second signal path followed later by the first signal path, the second signal path comprising a second encoder; and
erasing the tone from the second signal path, at least during at least a portion of time the second signal path is selected.

* * * * *